(12) United States Patent
Cummings

(10) Patent No.: US 7,828,298 B2
(45) Date of Patent: Nov. 9, 2010

(54) FIREWALL SEALING ASSEMBLY

(75) Inventor: Mark R. Cummings, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 418 days.

(21) Appl. No.: 11/742,089

(22) Filed: Apr. 30, 2007

(65) Prior Publication Data
US 2008/0265526 A1 Oct. 30, 2008

(51) Int. Cl.
F16L 5/10 (2006.01)
(52) U.S. Cl. ............................ 277/502; 277/635
(58) Field of Classification Search ............. 277/502, 277/634, 635; 52/317
See application file for complete search history.

(56) References Cited

U.S. PATENT DOCUMENTS

| | | | |
|---|---|---|---|
| 4,331,338 A | | 5/1982 | Caldwell et al. |
| 4,758,003 A | * | 7/1988 | Goldstein et al. ............ 277/314 |
| 4,758,028 A | | 7/1988 | Davies et al. |
| 5,145,191 A | * | 9/1992 | Stewart et al. ............... 277/636 |
| 5,458,343 A | | 10/1995 | Dornfeld et al. |
| 6,145,891 A | * | 11/2000 | Youngs ....................... 285/205 |
| 6,612,620 B1 | * | 9/2003 | Nordstrom et al. ......... 285/139.1 |
| 6,848,227 B2 | * | 2/2005 | Whitty ........................ 52/232 |
| 2003/0201613 A1 | | 10/2003 | Matczak et al. |
| 2007/0114791 A1 | * | 5/2007 | Williams ................... 285/142.1 |

FOREIGN PATENT DOCUMENTS

| | | |
|---|---|---|
| DE | 884324 | 9/2008 |
| EP | 1482228 A1 | 12/2004 |
| EP | 1764539 A2 | 3/2007 |
| WO | 9815765 | 4/1998 |

OTHER PUBLICATIONS

European Search Report EP08155512.0 dated Sep. 1, 2008.

* cited by examiner

*Primary Examiner*—Shane Bomar
*Assistant Examiner*—Gilbert Y Lee
(74) *Attorney, Agent, or Firm*—Ingrassia Fisher & Lorenz, P.C.

(57) ABSTRACT

A firewall sealing assembly is provided for use between a firewall and a penetrating member. The assembly comprises a flexible coupling and a secondary seal. The flexible coupling is configured to provide a primary seal between the firewall and the penetrating member. The secondary seal is configured to provide a secondary seal between the firewall and the penetrating member. The secondary seal is positioned spaced apart from the flexible coupling to define a seal cavity there between.

20 Claims, 2 Drawing Sheets

FIREWALL SEALING ASSEMBLY

TECHNICAL FIELD

The present invention relates to firewall seals, and more particularly to firewall seals for pass-throughs that substantially seal one side of the firewall from the other.

BACKGROUND

Aircraft typically include firewalls that isolate fire zones from non-fire zones, or one fire zone from another fire zone. In one particular implementation, an aircraft engine includes a firewall that divides the engine into a fire zone and an ignition zone. Typically the fire zone is located in a forward section of the engine and is cooler than the ignition zone, which is located downstream of the fire zone. The firewall is generally annular in shape and located proximate the engine combustor. The firewall surrounds various engine lines, such as fuel and oil lines that provide fuel and oil to the combustor. During operation of the engine, the firewall serves to reduce the possibility of any fuel or oil that has leaked into the fire zone from reaching the ignition zone, where it may ignite and damage the engine and its components. The Federal Aviation Agency (FAA) has stated that firewalls of this type must be capable of containing a fire occurring in the fire zone for a predetermined amount of time. The typical fire test requirements as promulgated by the FAA in Circular 20-135 include withstanding fire at 2,000° F. (1093° C.) for fifteen minutes.

Often, a firewall may include openings that allow system connection equipment, such as ducting, piping and/or wires to extend therethrough to connect the systems to each other. In an aircraft engine, a plurality of pass-through members, such as high pressure (HP) bleed lines, thermal anti-ice (TAI) lines, and electrical wires pass through the firewall and are sealed to prevent or minimize communication of any fuel or oil leakage between the fire zone and the ignition zone. In some cases, gaps may be present between the pass-through members and the firewall, which, in the unlikely event of a fire, may provide a space through which flames may travel. As a result, specialized firewall seals may need to be included between the equipment and the firewall to prevent the flames from traveling from one side of the firewall to the other.

Attempts have been made to meet the FAA requirement for engine firewalls by sealing the firewall pass-throughs in various ways. Many types of firewall seals have been devised that require the positioning of a portion of a sealing structure through an aperture formed in the firewall. The pass-through line extends through an opening formed in the sealing structure. However, due to typical manufacturing tolerances, these types of structures may be seated in a laterally offset manner from the centerline of the firewall aperture, or may be misaligned, which decreases the sealing effect. In addition, over time damage may occur to the portion of the sealing structure that is in contact with the ignition zone.

Additional attempts at sealing firewall pass-throughs include the use of a fireproof, reinforced silicone flexible coupling or boot that provides a barrier between the fire zone and the ignition zone by surrounding structural tubing that extends through the firewall. Testing for fireproofness of this type of single component structure often results in failure with ignition on the backside of the flexible coupling. Still other types of fittings include the use of bulkhead connectors, close tolerance fittings, single purpose penetration ducting or flanged connections at the firewall.

Although the above-mentioned firewall seals are in many instances adequate for preventing flames from traveling through the firewall, they suffer from certain drawbacks. In particular, many of the fittings do not provide adequate means to eliminate backside ignition, may include a number of components that together are relatively heavy and may undesirable increase aircraft weight, and/or may be relatively costly to implement. In addition, many of the fittings rigidly attach the system connection equipment to the firewall, which may unnecessarily increase the load on the fitting and/or the firewall.

It should thus be appreciated from the above that it would be desirable to provide a firewall pass-through seal assembly that complies with the FAA fireproof standard and eliminates damage to engine components due to seal failure. Furthermore, there is a need for a seal assembly that is relatively lightweight and inexpensive to implement. Other desirable features and characteristics of the present invention will become apparent from the subsequent detailed description of the invention and the appended claims, taken in conjunction with the accompanying drawings and this background of the invention.

BRIEF SUMMARY

There has now been developed a firewall sealing assembly for sealing between a firewall and a penetrating member, the assembly comprising a flexible coupling configured to provide a primary seal and a secondary seal. The primary seal is located between the firewall and the penetrating member. The secondary seal is configured to provide a secondary seal between the firewall and the penetrating member. The secondary seal is coupled to the flexible coupling and positioned spaced apart from the flexible coupling to define a seal cavity there between.

In yet another embodiment, there is provided a firewall sealing assembly for sealing between a firewall and a penetrating member, the assembly comprising a flexible coupling configured to provide a primary seal between the firewall and the penetrating member and a secondary seal. The secondary seal having an outer and an inner radial wall and an axial wall. The axial wall extending axially between the outer radial wall and the inner radial wall. The inner radial wall having an inner peripheral edge defining an opening through which the penetrating member may extend. The secondary seal coupled to the flexible coupling and positioned spaced apart from the flexible coupling to define a seal cavity there between.

In a further embodiment, still by way of example only, there is provided a firewall sealing assembly for sealing between a firewall and a penetrating member, the assembly comprising a flexible coupling configured to provide a primary seal between the firewall and the penetrating member; and a secondary seal. The secondary seal having an outer and an inner radial wall and an axial wall coupled there between. The axial wall extending axially between the outer radial wall and the inner radial wall. The inner radial wall having an inner peripheral edge defining an opening through which the penetrating member may extend. The secondary seal is positioned spaced apart from the flexible coupling. The assembly further includes a seal cavity defined between the flexible coupling and the secondary seal and an anti-friction plate disposed between the flexible coupling and the secondary seal and configured to decrease friction between the flexible seal and the secondary seal.

Other independent features and advantages of the improved firewall sealing assembly will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figure, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, before proceeding with the detailed description, it is to be appreciated that the described embodiment is not limited to use in conjunction with a specific type of vehicle or engine system. Thus, although the description is explicitly directed toward an embodiment that is implemented in an aircraft engine, it should be appreciated that it can be implemented in many types of vehicles and other system designs, including those known now or hereafter in the art.

Figure 1:
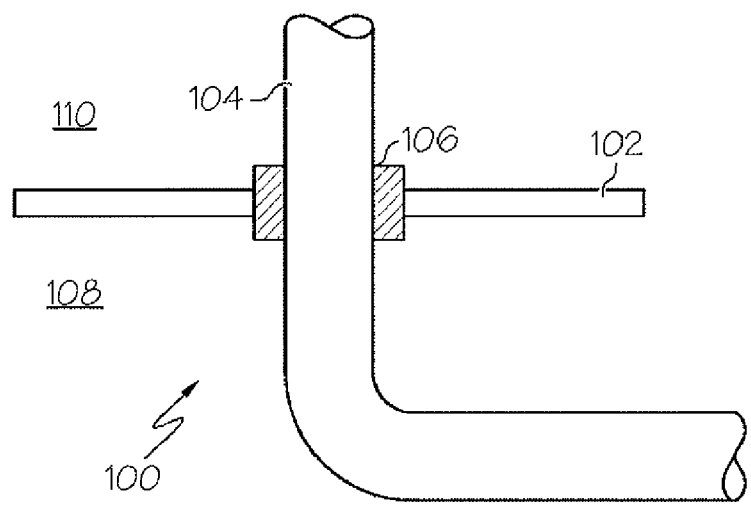
FIG. 1 is a cross section view of an exemplary firewall sealing assembly including a flexible coupling and secondary seal installed between a firewall and a duct.

Turning now to FIG. 1, an exemplary firewall sealing assembly 100 is shown mounted between a firewall 102 and a duct 104. The firewall sealing assembly 100 allows the duct 104 to extend through an opening 106 in the firewall 102 while minimizing fluid flow communication between a first section 108 on one side of the firewall 102 and a second section 110 on another side of the firewall 102. It will be appreciated that the duct 104 may alternatively be any one of numerous other components that may need to extend through the firewall opening 106, such as, for example, piping, wires, structural tubing, and any other penetrating member.

Figure 2:
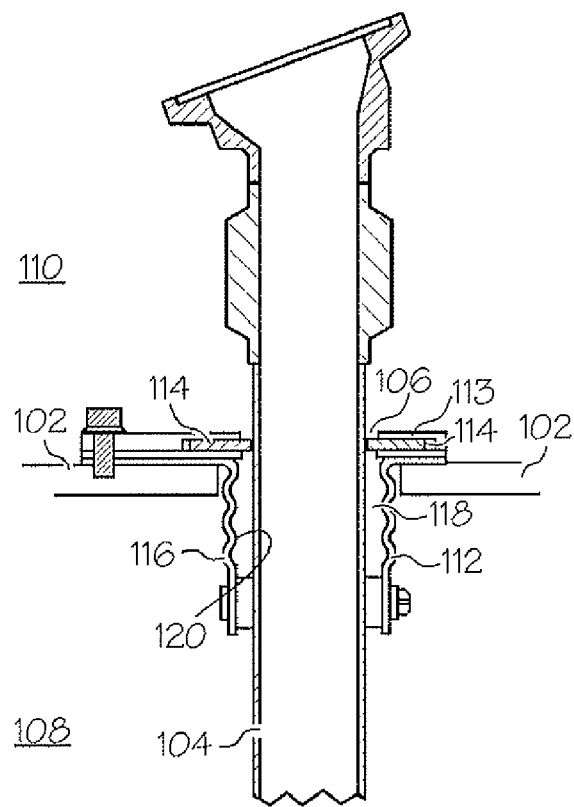
FIG. 2 is a close up view of a section of the firewall coupling and secondary seal depicted in FIG. 1.
Figure 3:
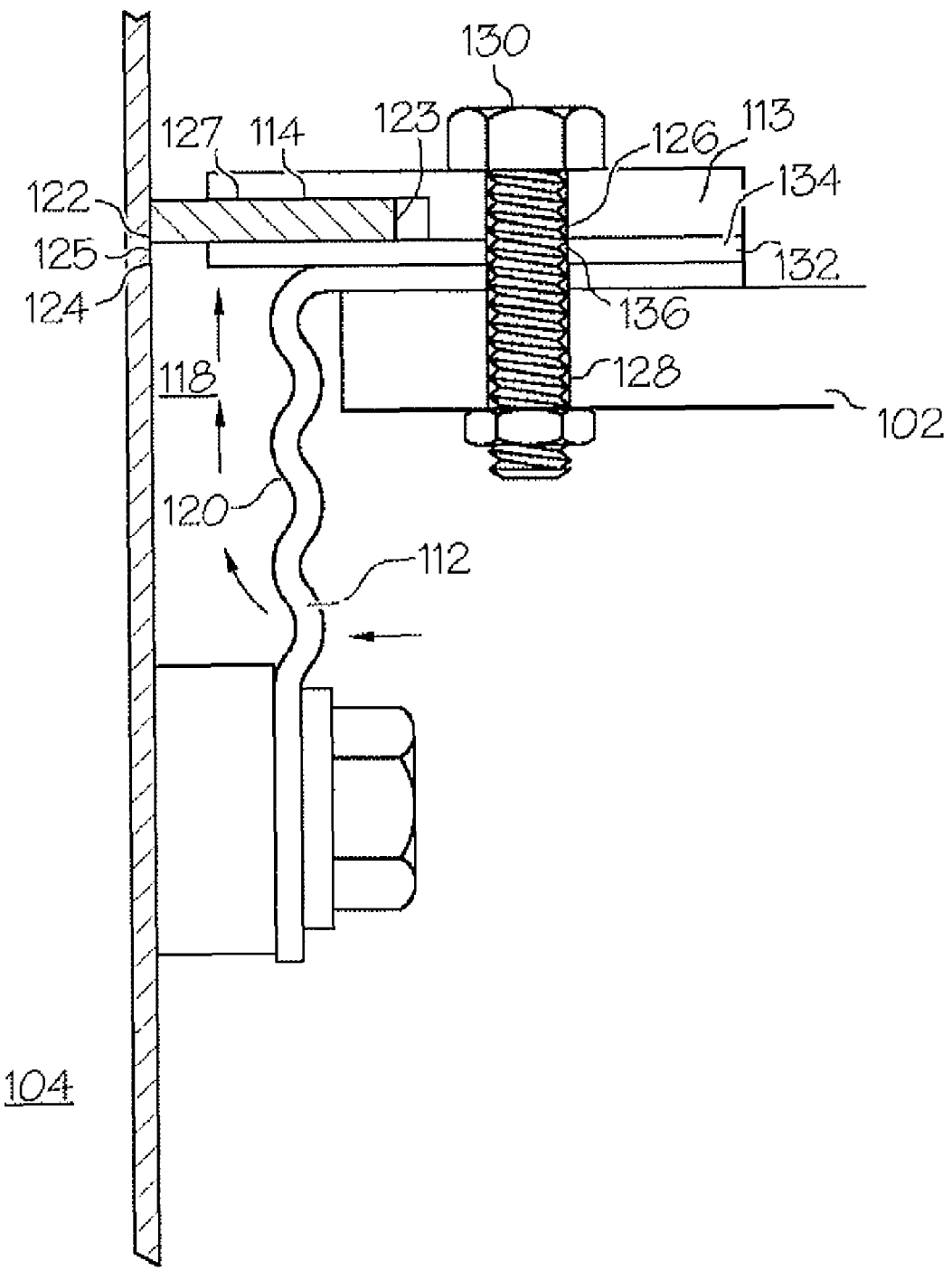
FIG. 3 is a close up view of a section of a firewall coupling and secondary seal.

FIGS. 2 and 3 are close up views of the firewall sealing assembly 100 depicted in FIG. 1. The firewall sealing assembly 100 includes redundant fire barriers comprised of a flexible coupling 112 and a secondary seal 114. The flexible coupling 112 is configured as a primary seal and is generally in the form of a fireproof boot 116. The flexible coupling 112 is coupled to a retaining collar 113 positioned about the duct 104 and the secondary seal 114. In a preferred embodiment the flexible coupling 112 is formed of a fireproof material, such as fiberglass reinforced silicone, that is configured to backside burn upon exposure to a predetermined temperature. The flexible coupling 112 and the secondary seal 114 define a seal cavity 118 there between. During operation, backside flames may be generated on a backside 120 of the flexible coupling 112. The backside flames are the result of combustible materials reaching high enough temperatures to ignite, but remain of low intensity. The backside flames burn within the seal cavity 118, being limited therein by the secondary seal 114. The secondary seal 114 thus is exposed to limited flame exposure in intensity and duration. In this respect, the flame side seal, or the flexible coupling 112, is sacrificial and may fail without any deleterious effect in that the secondary seal 114 prevents the flames from continuing. In this regard, the secondary seal 114 is constructed of a flexible fireproof material, such as, fiber reinforced plastic composite, for example graphite-bismaleimide. Other suitable fireproof materials that remain flexible may alternatively be used for the flexible coupling 112 and the secondary seal 114. The flexibility of the secondary seal 114, along with the radial clearance between the flexible coupling 112, the secondary seal 114, and the retaining collar 113 allows for relative movement of the duct 104 to the firewall 102.

As best seen in FIG. 3, the secondary seal 114 is generally annular in shape and includes an inner peripheral edge 122 that defines a duct opening 124. More specifically, the secondary seal 114 includes an outer radial wall 123 and an inner radial wall 125 and an axial wall 127 coupled there between, the axial wall 127 extends axially between the outer radial wall 123 and the inner radial wall 125. The inner radial wall 125 defines the inner peripheral edge 122 and the duct opening 124 through which the duct 104 extends. In one particular instance, the secondary seal 114 is a silicone washer that is conformable under pressure to the duct opening 124 and the duct 104. The duct opening 124 is sufficiently sized to allow the duct 104 to extend therethrough. The secondary seal 114 may optionally include a plurality of fastener openings 126, one of which is shown in FIG. 3. The plurality of fastener openings 126 are disposed in a pattern such that at least selected ones correspond to one or more spaced apart firewall fastener openings 128, and each is configured to receive fasteners 130 for mounting the secondary seal 114 to the firewall 102. In this particular embodiment illustrated in FIG. 3, the fasteners 130, of which only one is shown, is configured to protrude through the firewall 102. In the embodiment illustrated in FIG. 2, the fastener 130, of which only one is shown, is configured to reside within the firewall 102 when fastened. An optional anti-friction plate 132 may provide for decreased friction during movement between the flexible coupling 112 and the secondary seal 114.

The optional anti-friction plate 132 is preferably configured as an annular shaped component and includes a plurality of tabs 134 extending from a periphery thereof. Each of the plurality of tabs 134 includes a fastener opening 136 such that at least selected ones correspond to one or more spaced apart firewall fastener openings 128. Each of the fastener openings 136 is configured to receive fasteners 130 for mounting the secondary seal 114 to the firewall 102.

To further minimize the travel of fire through the firewall 102, gaskets may be included between the secondary seal 114 and the firewall 102. Flow through the firewall sealing assembly 100 is indicated by the directional arrows in FIG. 3. In the instance where the flexible coupling 112 fails, or is subject to backside ignition, the secondary seal 114 provides additional protection to the second section 110.

A firewall sealing assembly 100 has now been provided that is fireproof and relatively lightweight. Additionally, the assembly includes few parts and is relatively simple to implement. The use of the flexible coupling 112, the secondary seal 114, provision of the seal cavity 118 and sizing of the duct opening 124 relative to the duct 104, provide a floating redundant sealing interface between the firewall 102 and the duct 104.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A firewall sealing assembly for sealing between a firewall and a penetrating member comprising:
   a flexible coupling configured to provide a primary seal between the firewall and the penetrating member;
   a secondary seal configured to provide a secondary seal between the firewall and the penetrating member, the secondary seal configured in sealing engagement with the penetrating member, the secondary seal coupled to the flexible coupling and positioned spaced apart from the flexible coupling; and
   a seal cavity defined by the flexible coupling, the secondary seal and the penetrating member and configured to contain a backside flame generated on a backside of the flexible coupling.

2. A firewall sealing assembly as claimed in claim 1, wherein the flexible coupling is configured to backside burn upon exposure to a predetermined temperature.

3. A firewall sealing assembly as claimed in claim 1, wherein the secondary seal includes an outer radial wall, an inner radial wall, and an axial wall, the axial wall extending axially between the outer radial wall and the inner radial, the inner radial wall having an inner peripheral edge defining an opening through which the penetrating member may extend.

4. A firewall sealing assembly as claimed in claim 3, wherein the secondary seal is a conformable fire resistant washer.

5. A firewall sealing assembly as claimed in claim 1, wherein the flexible coupling and the secondary seal are comprised of a fireproof material.

6. A firewall sealing assembly as claimed in claim 5, wherein the flexible coupling comprises fiberglass reinforced silicone.

7. A firewall sealing assembly as claimed in claim 5, wherein the secondary seal comprises fiber reinforced plastic composite.

8. A firewall sealing assembly as claimed in claim 7, wherein the secondary seal comprises graphite-bismaleimide.

9. A firewall sealing assembly for sealing between a firewall and a penetrating member comprising:
   a flexible coupling configured to provide a primary seal between the firewall and the penetrating member; and
   a secondary seal configured to provide a secondary seal between the firewall and the penetrating member, the secondary seal having an outer and an inner radial wall and an axial wall, the axial wall extending axially between the outer radial wall and the inner radial wall, the inner radial wall having an inner peripheral edge defining an opening through which the penetrating member may extend, the inner peripheral edge configured in sealing engagement with the penetrating member, the secondary seal coupled to the flexible coupling and positioned spaced apart from the flexible coupling;
   a seal cavity formed there between the flexible coupling and the secondary seal, the seal cavity defined by the flexible coupling, the secondary seal and the penetrating member and configured to contain a backside flame generated on a backside of the flexible coupling.

10. A firewall sealing assembly as claimed in claim 9, further including an anti-friction plate configured to decrease friction between the flexible coupling and the secondary seal.

11. A firewall sealing assembly as claimed in claim 9, wherein the secondary seal is a conformable fire resistant washer.

12. A firewall sealing assembly as claimed in claim 9, wherein the flexible coupling is configured to backside burn upon exposure to a predetermined temperature.

13. A firewall sealing assembly as claimed in claim 9, wherein the flexible coupling and the secondary seal are comprised of a fireproof material.

14. A firewall sealing assembly as claimed in claim 13, wherein the flexible coupling comprises fiberglass reinforced silicone.

15. A firewall sealing assembly as claimed in claim 13, wherein the secondary seal comprises fiber reinforced plastic composite.

16. A firewall sealing assembly as claimed in claim 15, wherein the secondary seal comprises graphite-bismaleimide.

17. A firewall sealing assembly for sealing between a firewall and a penetrating member comprising:
   a sacrificial flexible coupling configured to provide a primary seal between the firewall and the penetrating member;
   a secondary seal configured to provide a secondary seal between the firewall and the penetrating member, the secondary seal having an outer and an inner radial wall and an axial wall coupled there between, the axial wall extending axially between the outer radial wall and the inner radial wall, the inner radial wall having an inner peripheral edge defining an opening through which the penetrating member may extend, the inner peripheral edge configured in sealing engagement with the penetrating member, the secondary seal positioned spaced apart from the flexible coupling;
   a seal cavity defined between the flexible coupling and the secondary seal, the seal cavity defined by the sacrificial flexible coupling, the secondary seal and the penetrating member and configured to contain a backside flame generated on a backside of the sacrificial flexible coupling; and
   an anti-friction plate disposed between the flexible coupling and the secondary seal to decrease friction there between.

18. A firewall sealing assembly as claimed in claim 17, wherein the secondary seal is a conformable fire resistant washer.

19. A firewall sealing assembly as claimed in claim 18, wherein the sacrificial flexible coupling and the secondary seal are comprised of a fireproof material.

20. A firewall sealing assembly as claimed in claim 19, wherein the sacrificial flexible coupling comprises fiberglass reinforced silicone and the secondary seal comprises fiber reinforced plastic composite.

* * * * *